Nov. 26, 1940.  A. G. F. WALLGREN  2,222,730

VALVE FOR ENGINES AND THE LIKE

Filed Aug. 15, 1939  2 Sheets-Sheet 1

INVENTOR
August Gunnar Ferdinand Wallgren
BY
Jarvis C. Markle
ATTORNEY

Nov. 26, 1940.  A. G. F. WALLGREN  2,222,730
VALVE FOR ENGINES AND THE LIKE
Filed Aug. 15, 1939  2 Sheets-Sheet 2

INVENTOR
August Gunnar Ferdinand Wallgren
BY
his ATTORNEY

Patented Nov. 26, 1940

2,222,730

UNITED STATES PATENT OFFICE 2,222,730

VALVE FOR ENGINES AND THE LIKE

August Gunnar Ferdinand Wallgren, Eskilstuna, Sweden, assignor to Aktiebolaget Bolinder-Munktell, Eskilstuna, Sweden, a corporation of Sweden Application August 15, 1939, Serial No. 290,159
In Sweden August 16, 1938

15 Claims. (Cl. 123—188)

The present invention relates to valves and has particular reference to cylinder valves for internal combustion engines.

The invention is particularly advantageous when used in conjunction with two stroke cycle engines of the scavenging type and will be described in connection with such use, although it is to be understood that the invention is not limited to use in such engine structures but may advantageously be applied to other types of internal combustion engines, the cylinders of compressors, or the like.

In the operation of internal combustion engines, particularly two stroke cycle engines, the complete scavenging of the combustion gases from the cylinder is relatively difficult to attain. This is particularly true when piston controlled inlet and exhaust ports are employed and in order to eliminate difficulties heretofore encountered in obtaining sufficiently complete scavenging, it has been proposed to scavenge by providing a mechanically actuated exhaust valve in the cylinder head, to permit direct flow scavenging by means of air admitted through ports at the bottom of the cylinder and exhausted through such valve.

This arrangement has heretofore not provided a completely satisfactory solution to the problem since poppet valves of the kind ordinarily employed cannot for practical reasons be made of such size and placed in such location, even when multiple valves are employed, to secure a completely effective scavenging effect.

The present invention aims to improve upon prior valve constructions, particularly for exhaust valves for internal combustion engines, by the provision of improved valve and valve mounting structure embodying a ring-like valve opening controlled by a ring-like valve head which is actuated through the medium of a plurality of valve stems connected in peripherally spaced relation to the valve head and extending through the cylinder structure. Such type of valve provides numerous advantages because of the possibility of providing more symmetrical flow of gases from the cylinder and because of the relatively very large port area past the valve seats that can be obtained with a valve of given diameter of this type.

With such type of valve, particularly when it employed as an exhaust valve subject to direct contact with the high temperature cylinder and exhaust gases, difficulty is encountered in mounting the valve to permit the requisite expansion and contraction of the movable valve member, particularly the valve head, with respect to the cylinder structure, which is induced by the difference in operating temperature between the relatively hot valve and the relatively cool cylinder structure. Prior constructions either involve the danger of sticking or binding of the valve or resort to constructions which, because of excessive clearances, permit undesirable leakage of gases between the cylinder structure and the moving valve parts.

In accordance with the present invention, improved valve structure is provided whereby the advantages of the ring-shaped type of valve may be availed of while at the same time the disadvantages inherent in such type of valve as previously constructed are eliminated and the valve permitted to have freedom of contraction and expansion relative to the cylinder structure without binding and without leakage of gases past the valve parts.

The manner in which the objects of the invention are attained and the advantages to be derived from its use may best be understood by a consideration of the ensuing portion of this specification in which there are described by way of example, but without limitation, suitable forms of valve structure embodying the principles of the invention.

Referring now to the drawings.

Figure 1:
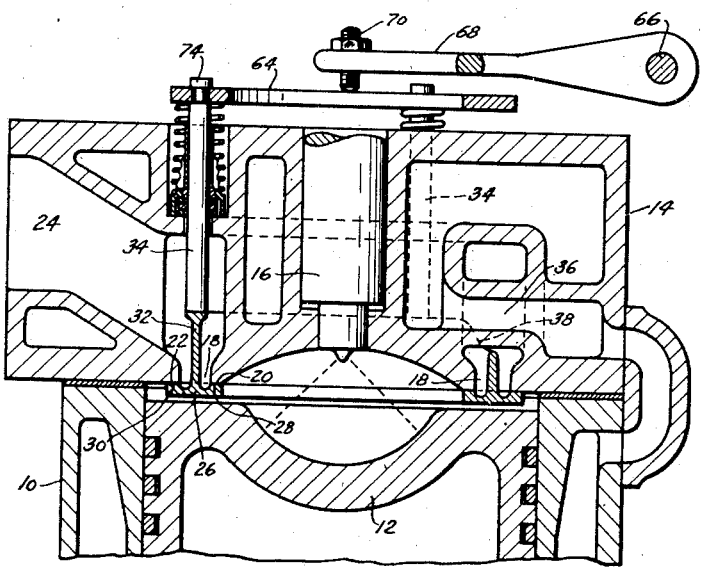
Fig. 1 is a central longitudinal section of the upper portion of an engine cylinder provided with a preferred form of valve construction embodying the invention.

Referring now more particularly to Figs. 1 to 4, inclusive, 10 designates the upper portion of an internal combustion engine cylinder, in which is located piston 12. The cylinder 10 is provided with a head 14 which in the embodiment illustrated is detachable from the cylinder but which in so far as the present invention is concerned may be made integral therewith. The head 14 constitutes a part of the rigid cylinder structure. In the embodiment shown, which may be of the two stroke cycle injection type, the fuel injector is indicated at 16, for central injection of fuel. These parts may be of any known construction and need not be described herein in further detail.

The cylinder head 14 is provided with a valve opening 18 of ring-like form which preferably, as in the present instance, is a complete annulus concentric with the axis of the cylinder. The port opening 18 provides radially spaced inner and outer valve seats 20 and 22, respectively, and the valve opening communicates with a gas passage 24 which in the present instance may be considered as an exhaust passage.

A ring-like valve member having a valve head 26 is provided, the valve head having spaced annular inner and outer valve faces 28 and 30, respectively, adapted to co-act with the valve seats in the cylinder head.

A peripherally extending projection or flange 32 extends through the valve opening 18 in radially spaced relation to the valve seats 20 and 22 and has connected thereto a plurality of circumferentially spaced valve stems 34 which advantageously may be three in number and two of which are shown in Fig. 1.

In the event the cylinder head is liquid cooled, as is usually the case, one or more connecting passages such as shown at 36 may be desirable in order to provide for proper drainage of the jacket spaces in the head and in the event such connecting passages are employed, and are located at a relatively low level in the head in order to secure the desired drainage, the flange 32 on the valve may be provided at spaced intervals with recesses such as that shown at 38 to provide the required clearance.

Figure 2:
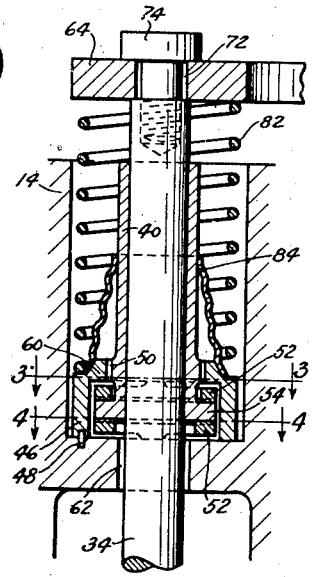
Fig. 2 is a section on larger scale showing a portion of the structure illustrated in Fig. 1.
Figure 3:
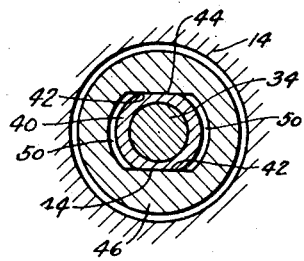
Fig. 3 is a section taken on the line 3—3 of Fig. 2.

Referring now more particularly to Fig. 2, the valve stems 34 are provided with guides 40 of sleeve-like form through which the stems pass with a sliding fit sufficiently tight to prevent appreciable gas leakage between the stems and the guides. The guides 40 are mounted to permit lateral movement thereof relative to the rigid cylinder structure provided by the head 14 and in order to provide such movement the lower portions of the guides are provided with guide surfaces 42 (Fig. 3) arranged to co-act in sliding relation with cooperating surfaces 44 on a mounting member in the form of an annular guide ring 46 which is rigidly located in the cylinder head, as by means of one or more pins 48 and which forms a part of the rigid cylinder structure. The guide surfaces 42 and 44 are arranged in each case so as to permit the valve guide 40 to move in radial direction (from the axis of the valve as a center) with respect to the rigid guide part 46 and in order to permit such movement, substantial clearance in radial direction is provided between the outer surface of the guide 40 and the opening in the part 46 in which the guide is located. Such clearance is indicated at 50 in Fig. 3. It will thus be apparent that the guide surfaces operate to definitely center the valve head in proper relation to the valve seats while at the same time permitting it and the associated valve stems to move radially so as to permit contraction and expansion thereof relative to the rigid cylinder structure. As shown in Fig. 1, the valve seats and faces are preferably plane to readily permit lateral movement of the valve head relative to the valve seats under the influence of contraction and expansion, without in any way interfering with the proper seating of the surfaces against each other.

Figure 4:
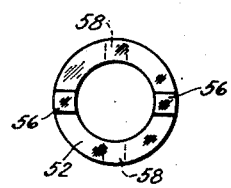
Fig. 4 is a plan view of a part shown in Figs. 1 and 2.

As shown in Fig. 2, the valve guides 40 are preferably mounted by means of Cardan joint structure to permit them to tilt into a slightly oblique position, if required, in order to insure against any binding between the guides and the valve stems. To this end two Cardan rings 52 are interposed between the flange-like projection 54 at the lower end of the guides 40 and the rigid parts of the cylinder structure. Each of the Cardan rings 52 is advantageously of known form, as shown in Fig. 4, having two diametrically opposed projections 56 on one face and two diametrically opposed projections 58 on the opposite face offset 90° with respect to the projections 56.

As will be seen from Fig. 2, one of the rings 52 is located between the upper face of the flange 54 and the lower face of an inwardly extending flange 60 formed at the upper end of the mounting ring 46, while the second ring is located between the lower face of flange 54 and the bottom of the recess in the cylinder head in which the parts are mounted.

It is to be noted that the opening 62 in the cylinder head structure through which the valve stem extends into the gas passage is made to provide substantial clearance to permit radial movement of the valve stem without binding against the cylinder structure at this point.

In the embodiment shown, the upper ends of the valve stems are attached to a common valve operating member 64 adapted to be depressed to open the valve by means of any suitable form of mechanical valve actuating gear, which in the embodiment shown comprises the valve operating shaft 66 and a valve arm 68 (which may be forked), and which bears on the annular valve operating member 64 at one or more places, preferably through an adjustable connection such as that shown at 70.

Openings 72 are provided in the operating member 64, which openings are sufficiently large to permit lateral movement of the valve stems with respect to the member as will be evident from Fig. 2. In the construction illustrated in that figure, the valve stems are connected to the member by means of studs or the like 74, the heads of which bear against the upper face of member 64 and the stems of which are threaded into the valve stems.

Figure 5:
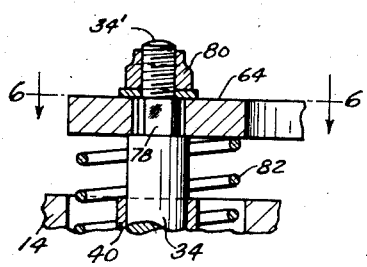
Fig. 5 is a fragmentary section showing another form of construction of a part of the structure shown in Fig. 1.
Figure 6:
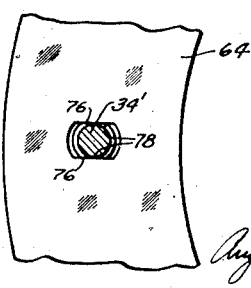
Fig. 6 is a section taken on the line 6—6 of Fig. 5.

In some instances it may be desirable to guide the valve operating member 64 by means of the valve stems and an alternative construction suitable for this purpose is shown in Figs. 5 and 6. In this arrangement the member 64 is provided with radially extending slots providing guide surfaces 76 cooperating with surfaces 78 on the outer ends 34' of the stems which are held in position by means of nuts 80 or equivalent means, such securing means being sufficiently loose to permit radial sliding movement between the valve stems 34 and the member 64.

The valve is closed by means of suitable spring means and in the embodiments illustrated, such means comprises springs 82 compressed between the operating member 64 and the fixed mounting member 46.

A yieldable diaphragm 84 encircles each of the valve guides 40 and is fixed thereto and to the mounting member 46 associated therewith. Each of these diaphragms provides a seal between the parts to which it is attached and the diaphragms preferably are of metal and corrugated or otherwise made readily yieldable to permit the relative lateral movement between the parts to which it is attached. The extent of relative movement between the parts connected by the diaphragms is sufficiently small to readily permit the use of metal for the diaphragm parts without imposing appreciable strains on any part of the apparatus.

It is believed that the advantages to be derived from the construction previously described are largely apparent from the drawings. The valve opening provided is of large area and may be located in a manner such as to provide for efficient removal of all residual gases in the cylinder. At the same time the required expansion and contraction of the valve head relative to the cylinder head may take place without any binding action since the several valve stems are free to move radially in and out under the influence of such expansion and contraction. Even with the freedom of movement permitted the valve stems, a tight seal against gas leakage is maintained since a sliding slide fit is maintained between the valve stems and their guides, which fit is sufficiently close to prevent appreciable gas leakage immediately around the stems. Leakage of gas through the clearance spaces such, for example, as the spaces 50 and 62, between the valve stem and the cylinder structure and between the valve guides, and the parts with respect to which they have relative movement, is prevented by the diaphragm seals. Further, the Cardan joint mounting of the guides 40 contributes to the prevention of binding, since the valve guides can readily assume whatever slightly oblique position they may be required to take to compensate for any lack of absolute parallelism between the several valve stems.

Figure 7:
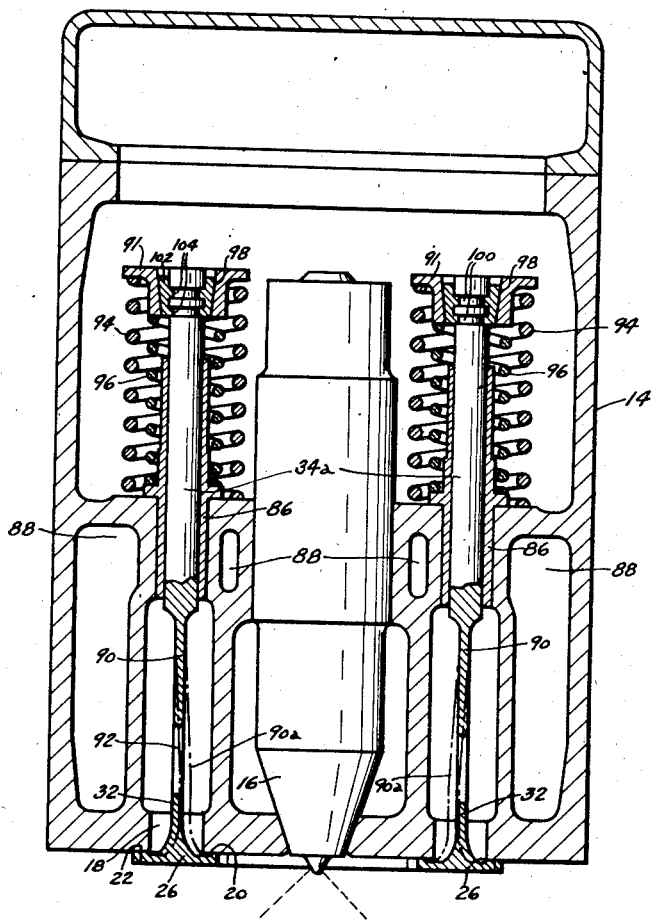
Fig. 7 is a section of a cylinder head showing another form of valve construction.
Figure 8:
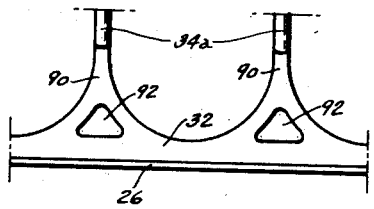
Fig. 8 is a side view on a reduced scale showing a part of the structure illustrated in Fig. 7, which part is imagined to be straightened out in a plane.

While in the previous description a preferred form of construction has been described, the principles of the invention may be embodied in other forms of structure and by way of example there is shown in Figs. 7 and 8 another arrangement.

In this arrangement the valve stems 34a are guided in the cylinder head 14, preferably in valve guides 86 of relatively great length pressed into the head with the lower part of the same, and fit in their guides with a sliding fit preventing appreciable gas leakage past the stems. Said lower parts of the guides are surrounded by channels 88 for cooling liquid. The inner bore of the guides 86 is in metal connection with the cooling liquid whereby cooling of the relatively movable surfaces of the guides and of the stems is facilitated. The valve head 26 and projecting flange 32 may be of the same general construction as that previously described. In the present instance, however, the valve stems are connected to the valve head through members 90 which are yieldable radially of the axis of the valve. The members 90 are preferably of rectangular or like cross section with greater dimensions in peripheral than in radial direction. The members are at the same time sufficiently rigid to resist the stresses acting upon the same, especially when opening the valve. The peripheral extension of the members 90 increases towards the flange 32 as appears from Fig. 8. Preferably, recesses 92 are provided in the base portion of the members 90 in order to improve the resiliency of the latter.

It has been found that the valve head 26 can expand and contract due to the yieldable construction of the members 90 without transmitting any binding force to the valve stems which would tend to make them bind in their guides. Preferably, the diameter of the valve head 26 is in its cold condition so chosen that the members 90 must be bent outwardly in order that the valve stems 34a shall fit with the inner bores of the guides 86. The members 90 then take somewhat the position indicated by the dash and dot lines 90a in Fig. 7. When the engine is started there will be some moment acting on the stems 34a and providing frictional resistance between the stems and their guides. However, as soon as the engine becomes warm, the valve head 26 expands so that said moment ceases. The valve springs 94 and 96 are of sufficient strength to overcome the additional friction between the valve stems 34a and their guides on starting the engine. Alternatively, the diameter of the valve head 26 may be so chosen that the yielding members 90 are slightly bent inwardly when the valve head is cold and slightly outwardly when it becomes warm.

The spring holding members 91 have in this embodiment recesses 98 tapering towards the valve head 26. The upper parts of the valve stems 34a are recessed as at 100. A sleeve 102 made in two halves is provided with projections 104 engaging the recesses 100. The outer surfaces of the ring halves 102 are tapered in the same manner as the recess 98 of the members 91. When assembling the valve construction the members 91 are displaced downwardly by compressing the springs 94, 96 until the ring halves 102 can be placed with their projections 104 in the recesses 100 of the stem 34a. Thereafter the springs 94, 96 are allowed to expand whereby the ring halves 102 enter the recess 98 of the members 91.

The flange projecting inwardly through the valve opening serves to make the valve head more rigid and to prevent its warping under the influence of high temperatures, which tendency is likely to occur particularly in the case of valves of large diameter.

The flange also has a second useful function in that it assists in dissipating heat from the valve head, thereby tending to keep it at lower temperature. Even in cases where the valve is employed as an exhaust valve, the temperature of the exhaust gases in the cooled passage leading from the valve opening is less than the temperature of the gases on the cylinder side of the valve and the relatively cooler gases sweeping past this flange in the valve passage carry heat therefrom which is conducted to the flange through the valve head from the hottest portion of the valve head which lies within the cylinder.

The invention is obviously not limited to the forms of construction hereinbefore described nor is its application limited to any specific form of engine or compressor or its use as an inlet or an exhaust valve. Also, it will be apparent that in the case of large cylinders or the like, two or more such valves arranged concentrically one within the other may be employed, so that in the operation, for example, of a four stroke cycle internal combustion engine, the engine may be employed both for the inlet and exhaust valves timed to open and close at different times.

It is accordingly to be understood that the invention embraces all forms of construction falling within the scope of the appended claims.

What is claimed is:

1. Apparatus of the character

1. Apparatus of the character described comprising rigid cylinder structure having a ring shaped valve opening, a valve head for closing said opening, a plurality of valve stems connected to said head and extending through said cylinder structure, means for guiding said stems with respect to said cylinder structure and for preventing gas leakage through said cylinder structure around said stems, and means for permitting lateral expansion and contraction of the valve head with respect to said cylinder structure.

2. Apparatus of the character described comprising rigid cylinder structure providing a ring shaped valve opening, a valve head for closing said opening, a plurality of valve stems connected to said head and extending through said cylinder structure, valve guides for said stems, said guides fitting said stems relatively closely to prevent appreciable gas leakage past said stems when said valve is open, and a plurality of connections operatively associated with the valve structure for permitting lateral expansion and contraction of the valve head with respect to said rigid cylinder structure.

3. Apparatus of the character described comprising rigid cylinder structure having a ring shaped valve opening, a movable valve member comprising a valve head and a plurality of valve stems rigidly connected to said head and extending through said rigid cylinder structure, guides for said stems, said guides being mounted to permit movement thereof in radial direction with respect to said cylinder structure, whereby to permit lateral expansion and contraction of the valve head with respect to the cylinder structure, and means providing a seal for preventing gas leakage past said movable guides when said valve is open.

4. Apparatus of the character described comprising rigid cylinder structure having a ring shaped valve opening, a valve member comprising a valve head and a plurality of valve stems rigidly connected thereto, guides for said stems, means for mounting said guides to permit radial movement thereof with respect to said rigid cylinder structure, whereby to permit lateral expansion and contraction of the valve head with respect to the cylinder structure, said mounting means including a Cardan connection for permitting said guides to tilt with respect to said cylinder structure, and sealing means around said guides for preventing gas leakage between the guides and the rigid cylinder structure.

5. Apparatus of the character described comprising rigid cylinder structure having a ring shaped valve opening, a movable valve member including a valve head for closing said opening and a plurality of valve stems rigidly connected to said head and extending through said cylinder structure, guides for said stems, means for mounting said guides to have lateral movement with respect to said cylinder structure, and a yieldable diaphragm secured to each of said guides and to rigid cylinder structure to provide a gas tight seal between the guide and the rigid structure.

6. Apparatus of the character described comprising rigid cylinder structure having a ring shaped valve opening, a movable valve member including a valve head for closing said opening and a plurality of valve stems rigidly connected to said head and extending through said cylinder structure, guides for said stems, a guide sleeve for each of said stems, a mounting member fixed to the cylinder structure around each of said stems, said guide sleeves and mounting members having cooperating guide surfaces for permitting movement of the guide sleeves in radial direction only with respect to the axis of the valve member, and a yieldable sealing diaphragm connecting each of said sleeves with its associated mounting member to prevent gas leakage therebetween when the valve is open.

7. Apparatus of the character described comprising rigid cylinder structure providing a ring shaped valve opening having radially spaced valve seats, a ring shaped valve head having faces adapted to engage said seats to close said opening and a ring shaped projection extending between said seats and spaced therefrom into the passage controlled by said opening and a plurality of valve stems connected to said projection and extending through said cylinder structure to actuate said valve.

8. Apparatus of the character described comprising rigid cylinder structure providing an annular valve opening having radially spaced inner and outer valve seats, a movable valve member comprising a valve head having radially spaced inner and outer valve faces adapted to engage said seats to close said opening, an annular flange extending between said valve seats and spaced therefrom into the passage controlled by said valve opening, and a plurality of valve stems secured to said flange and extending through said cylinder structure for actuating the valve.

9. Apparatus of the character described comprising rigid cylinder structure having a ring shaped valve opening, a movable valve member comprising a valve head for closing said opening, and a plurality of peripherally spaced valve stems rigidly connected to said head and extending through said cylinder structure, a common valve operating member engaging said stems externally of said cylinder structure, means for guiding said stems in said cylinder structure, said means permitting movement of the stems in radial direction with respect to the cylinder structure and connections between said stems and said common operating member permitting radial movement only of the stems with respect to said member.

10. In an internal combustion engine, rigid cylinder structure providing an annular exhaust valve opening in the cylinder head, a movable valve member having an annular valve head for closing said opening, an annular projection extending inwardly through said opening into the exhaust passage controlled thereby, a plurality of valve stems connected to said valve head and extending through the cylinder head, means for guiding said stems in said head, said means including guide surfaces permitting radial movement of the stems relative to the cylinder head, and sealing means for preventing leakage of exhaust gases between the rigid cylinder structure and the parts having relative radial movement with respect thereto.

11. Apparatus of the character described comprising rigid cylinder structure having a ring shaped valve opening, a movable valve member including a valve head for closing said opening and a plurality of valve stems extending through and guided in said cylinder structure, and a connection between each of said valve stems and said valve head for permitting relative movement in radial direction between the valve head and the stems, whereby to permit free lateral expansion and contraction of the valve head relative to said rigid cylinder structure.

12. Apparatus of the character described comprising rigid cylinder structure having a ring shaped valve opening, a movable valve member including a valve head for closing said opening and a plurality of valve stems extending through and guided in said cylinder structure, and a flexible connection yieldable in radial direction between each of said valve stems and said valve head for permitting relative movement in radial direction between the valve head and the stems.

13. Apparatus of the character described comprising rigid cylinder structure having a ring shaped valve opening, a movable valve member including a valve head for closing said opening and a plurality of valve stems extending through and guided in said cylinder structure, and a flexible connection yieldable in radial direction and rigid in peripheral direction between each of said valve stems and said valve head for permitting relative movement in radial direction between the valve head and the stems.

14. Apparatus of the character described comprising rigid cylinder structure having a ring shaped valve opening, a movable valve member including a valve head for closing said opening and a plurality of valve stems extending through and guided in said cylinder structure, and a connection between each of said valve stems and said valve head, each of said connections having greater extent in peripheral direction than in radial direction and being yieldable in the latter direction to permit relative movement in radial direction between the valve head and the stems.

15. Apparatus of the character described comprising rigid cylinder structure having a ring shaped valve opening, a movable valve member including a valve head for closing said opening and a plurality of valve stems extending through and guided in said cylinder structure, and a connection yieldable in radial direction between each of said valve stems and said valve head for permitting relative movement in radial direction between the valve head and the stems, the diameter of said valve head being related to the distance between the guides for said valve stems so that said connections are substantially free from radially directed forces due to expansion or contraction of the valve head when the latter is at normal operating temperature.

AUGUST GUNNAR FERDINAND
WALLGREN